United States Patent
Sammour et al.

(10) Patent No.: US 9,913,286 B2
(45) Date of Patent: *Mar. 6, 2018

(54) METHOD AND APPARATUS FOR PRIORITIZING LOGICAL CHANNELS

(71) Applicant: INTERDIGITAL PATENT HOLDINGS, INC., Wilmington, DE (US)

(72) Inventors: Mohammed Sammour, Alrabieh-Amman (JO); Stephen E. Terry, Northport, NY (US); Jin Wang, Princeton, NJ (US); Ulises Olvera-Hernandez, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,407

(22) Filed: Oct. 19, 2016

(65) Prior Publication Data

US 2017/0041933 A1 Feb. 9, 2017

Related U.S. Application Data

(63) Continuation of application No. 14/296,224, filed on Jun. 4, 2014, now Pat. No. 9,603,161, which is a
(Continued)

(51) Int. Cl.
*H04W 72/12* (2009.01)
*H04L 12/801* (2013.01)
(Continued)

(52) U.S. Cl.
CPC ......... *H04W 72/1263* (2013.01); *H04L 47/10* (2013.01); *H04L 47/14* (2013.01);
(Continued)

(58) Field of Classification Search
CPC ............. H04W 72/1263; H04W 72/14; H04W 76/046; H04W 28/14; H04W 72/0453;
(Continued)

(56) References Cited

U.S. PATENT DOCUMENTS 6,901,065 B1 5/2005 Ehrstedt et al.
6,937,561 B2 8/2005 Chiussi et al.
(Continued)

FOREIGN PATENT DOCUMENTS

AU 2003252519 A1 2/2005
CN 1757182 A 4/2006
(Continued)

OTHER PUBLICATIONS

3rd Generation Partnership Project (3GPP), R2-073221, "UE Transmission Power Headroom Report for LTE", Ericsson, 3GPP TSG-RAN WG2 #59, Athens, Greece, Aug. 20-24, 2007, 2 pages.
(Continued)

*Primary Examiner* — Kwang B Yao
*Assistant Examiner* — Syed M Bokhari
(74) *Attorney, Agent, or Firm* — Condo Roccia Koptiw LLP

(57) ABSTRACT

A method and apparatus are disclosed for prioritizing logical channels when a new transmission is performed. Logical channel resources are allocated for available data to a plurality of logical channels. A maximum bit rate (MBR) credit (i.e., token) is decremented in a buffer (i.e., bucket) associated with a particular one of the logical channels by the size of a medium access control (MAC) service data unit (SDU). The MBR credit may have a negative value. If any of the allocated channel resources remain, the logical channels are served n a decreasing priority order until the data is exhausted. A radio link control (RLC) SDU is not segmented if the whole RLC SDU fits into the remaining resources. The
(Continued)

MAC SDU excludes a MAC PDU header and MAC padding.

16 Claims, 2 Drawing Sheets

Related U.S. Application Data continuation of application No. 13/401,998, filed on Feb. 22, 2012, now Pat. No. 8,774,114, which is a continuation of application No. 12/360,343, filed on Jan. 27, 2009, now Pat. No. 8,165,152.

(60) Provisional application No. 61/025,383, filed on Feb. 1, 2008, provisional application No. 61/025,361, filed on Feb. 1, 2008.

(51) Int. Cl.

| | |
|---|---|
| H04L 12/819 | (2013.01) |
| H04W 28/14 | (2009.01) |
| H04W 72/14 | (2009.01) |
| H04W 76/04 | (2009.01) |
| H04W 28/06 | (2009.01) |
| H04W 72/04 | (2009.01) |

(52) U.S. Cl.
CPC ............ *H04L 47/215* (2013.01); *H04L 47/39* (2013.01); *H04W 28/14* (2013.01); *H04W 72/0453* (2013.01); *H04W 72/1242* (2013.01); *H04W 72/14* (2013.01); *H04W 76/046* (2013.01); *H04W 28/065* (2013.01); *H04W 72/04* (2013.01)

(58) Field of Classification Search
CPC ........... H04W 72/1242; H04W 28/065; H04W 72/04; H04L 47/14; H04L 47/39; H04L 47/10; H04L 47/215
USPC ......................................... 370/329, 235, 336
See application file for complete search history.

(56) References Cited

U.S. PATENT DOCUMENTS

| | | | |
|---|---|---|---|
| 7,873,006 B2 | 1/2011 | Yi et al. | |
| 8,374,084 B2 | 2/2013 | Randall et al. | |
| 8,396,081 B2 | 3/2013 | Aoyama et al. | |
| 8,750,124 B2* | 6/2014 | Guo ................... | H04W 72/1257 370/235.1 |
| 2002/0036984 A1 | 3/2002 | Chiussi et al. | |
| 2004/0185892 A1 | 9/2004 | Iacono et al. | |
| 2005/0136919 A1 | 6/2005 | Park et al. | |
| 2007/0073895 A1 | 3/2007 | Sebire et al. | |
| 2007/0104103 A1 | 5/2007 | Howe et al. | |
| 2007/0133605 A1 | 6/2007 | Herrmann | |
| 2008/0026738 A1 | 1/2008 | Jiang | |
| 2009/0104916 A1 | 4/2009 | Rosa et al. | |
| 2009/0154430 A1* | 6/2009 | Guo ................... | H04W 72/1257 370/336 |
| 2009/0163211 A1 | 6/2009 | Kitazoe et al. | |
| 2009/0186613 A1 | 7/2009 | Ahn et al. | |
| 2009/0252107 A1 | 10/2009 | Chun et al. | |
| 2010/0118796 A1 | 5/2010 | Yi et al. | |
| 2010/0225826 A1 | 9/2010 | Maandonks et al. | |
| 2010/0254340 A1 | 10/2010 | Park et al. | |
| 2010/0284314 A1 | 11/2010 | Pelletier et al. | |
| 2013/0107843 A1 | 5/2013 | Aoyama et al. | |
| 2013/0142145 A1 | 6/2013 | Choi | |

FOREIGN PATENT DOCUMENTS

| | | |
|---|---|---|
| CN | 1879339 A | 12/2006 |
| CN | 101018392 A | 8/2007 |
| CN | 101060690 A | 10/2007 |
| CN | 101075968 A | 11/2007 |
| EP | 1445969 A1 | 8/2004 |
| JP | 2009-147941 A | 7/2009 |
| JP | 2009-530949 A | 8/2009 |
| JP | 2010-506479 A | 2/2010 |
| JP | 2011-151814 A | 8/2011 |
| JP | 2012-130052 A | 7/2012 |
| KR | 10-2007-0112128 A | 8/2007 |
| RU | 2263415 C2 | 10/2005 |
| TW | 2008-07996 A | 2/2008 |
| WO | WO 2002/089486 A2 | 11/2002 |
| WO | WO 2005/009065 A1 | 1/2005 |
| WO | WO 2005/034418 A1 | 4/2005 |
| WO | WO 2006/067556 A1 | 6/2006 |
| WO | WO 2006/083131 A1 | 8/2006 |
| WO | WO 2007/088465 A2 | 8/2007 |
| WO | WO 2007/091715 A1 | 8/2007 |
| WO | WO 2008/041032 A2 | 4/2008 |
| WO | WO 2008/136489 A1 | 11/2008 |
| WO | WO 2008/156275 A2 | 12/2008 |

OTHER PUBLICATIONS

3rd Generation Partnership Project (3GPP), R2-073433, "Logical Channel Prioritization", Qualcomm Europe, 3GPP TSG-RAN WG2 #59, Athens, Greece, Aug. 20-24, 2007, 2 pages.

3rd Generation Partnership Project (3GPP), R2-075100, "UL Logical Channel Prioritization & Bit Rate Definition", NEC, 3GPP TSG-RAN WG2#60, Jeju, South Korea, Nov. 5-9, 2007, 3 pages.

3rd Generation Partnership Project (3GPP), R2-080089, "UL LCH Prioritization" Ericsson, 3GPP TSG-RAN WG2 Meeting #60bis, Sevilla, Spain, Jan. 14-18, 2008, 3 pages.

3rd Generation Partnership Project (3GPP), R2-080157, "Prioritization for Equal Priority RB," LG Electronics, Inc., 3GPP TSG-RAN WG2 Meeting #60bis, Sevilla, Spain, Jan. 14-18, 2008, 3 pages.

3rd Generation Partnership Project (3GPP), R2-080220, "UL Resource Utilisation", Nokia-Siemens-Networks, Nokia Corporation, 3GPP TSG-RAN WG2 Meeting #60bis, Sevilla, Spain, Jan. 14-18, 2008, 4 pages.

3rd Generation Partnership Project (3GPP), R2-080376, "Text Proposal for UL Logical Channel Prioritisation", Qualcomm Europe, 3GPP TSG-RAN WG2 #60bis, Sevilla, Spain, Jan. 14-18, 2008, 4 pages.

3rd Generation Partnership Project (3GPP), R2-080377, "Text Proposal for UL Logical Channel Prioritisation with Segmentation Optimisation", Qualcomm Europe, 3GPP TSG-RAN WG2 #60bis, Sevilla, Spain, Jan. 14-18, 2008, 5 pages.

3rd Generation Partnership Project (3GPP), R2-080549, "Minutes LTE UP Session", Chairman, 3GPP TSG RAN WG2#60bis, Sevilla, Spain, Jan. 14-18, 2008, 28 pages.

3rd Generation Partnership Project (3GPP), R2-080861, "Message 3 Contents and BSR Transmission after Handover", Panasonic, 3GPP TSG RAN WG2 #61, Sorrento, Italy, Feb. 11-15, 2008, 6 pages.

3rd Generation Partnership Project (3GPP), R2-081589, "BSR Priority", LG Electronics Inc., 3GPP TSG-RAN WG2 #61bis, Shenzhen, China, Mar. 31-Apr. 4, 2008, 1 page.

3rd Generation Partnership Project (3GPP), R2-082227, "Priority Handling of MAC Control Elements", Panasonic, 3GPP TSG RAN WG2#62, Kansas City, USA, May 5-9, 2008, 1 page.

3rd Generation Partnership Project (3GPP), R3-070239, "Draft CR to TS 36.300 in Relationship with the PDCP Placement", Qualcomm Europe, 3GPP TSG RAN3 (R2/R3/S2 JM), St. Louis, USA, Feb. 12-15, 2007, 72 pages.

3rd Generation Partnership Project (3GPP), TS 25.301 V6.5.0, "Technical Specification Group Radio Access Network, Radio Interface Protocol Architecture (Release 6)", Sep. 2007, pp. 1-48.

3rd Generation Partnership Project (3GPP), TS 25.301 V6.6.0, "Technical Specification Group Radio Access Network, Radio Interface Protocol Architecture (Release 6)", Mar. 2008, pp. 1-48.

(56) References Cited

OTHER PUBLICATIONS

3rd Generation Partnership Project (3GPP), TS 25.301 V7.3.0, "Technical Specification Group Radio Access Network, Radio Interface Protocol Architecture (Release 7)", Sep. 2007, pp. 1-49.
3rd Generation Partnership Project (3GPP), TS 25.301 V7.4.0, "Technical Specification Group Radio Access Network, Radio Interface Protocol Architecture (Release 7)", Mar. 2008, pp. 1-49.
3rd Generation Partnership Project (3GPP), TS 25.301 V8.0.0, "Technical Specification Group Radio Access Network, Radio Interface Protocol Architecture (Release 8)", Dec. 2007, pp. 1-49.
3rd Generation Partnership Project (3GPP), TS 25.301 V8.4.0, "Technical Specification Group Radio Access Network, Radio Interface Protocol Architecture (Release 8)", Dec. 2008, pp. 1-52.
3rd Generation Partnership Project (3GPP), TS 25.322 V6.10.0, "Technical Specification Group Radio Access Network, Radio Link Control (RLC) Protocol Specification (Release 6)", Jun. 2007, pp. 1-86.
3rd Generation Partnership Project (3GPP), TS 25.322 V6.12.0, "Technical Specification Group Radio Access Network, Radio Link Control (RLC) Protocol Specification (Release 6)", May 2008, pp. 1-86.
3rd Generation Partnership Project (3GPP), TS 25.322 V7.5.0, "Technical Specification Group Radio Access Network, Radio Link Control (RLC) Protocol Specification (Release 7)", Dec. 2007, pp. 1-88.
3rd Generation Partnership Project (3GPP), TS 25.322 V7.8.0, "Technical Specification Group Radio Access Network, Radio Link Control (RLC) Protocol Specification (Release 7)", Sep. 2008, pp. 1-87.
3rd Generation Partnership Project (3GPP), TS 25.322 V8.0.0, "Technical Specification Group Radio Access Network, Radio Link Control (RLC) Protocol Specification (Release 8)", Dec. 2007, pp. 1-89.
3rd Generation Partnership Project (3GPP), TS 25.322 V8.3.0, "Technical Specification Group Radio Access Network, Radio Link Control (RLC) Protocol Specification (Release 8)", Sep. 2008, pp. 1-88.
3rd Generation Partnership Project (3GPP), TS 36.300 V.8.7.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2008, pp. 1-144.
3rd Generation Partnership Project (3GPP), TS 36.300 V8.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2007, pp. 1-82.
3rd Generation Partnership Project (3GPP), TS 36.300 V8.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2007, pp. 1-121.
3rd Generation Partnership Project (3GPP), TS 36.321 V1.0.0, "Technical Specification Group Radio Access Network, Evolved Universal Terrestrial Radio Access (E-UTRA) Medium Access Control (MAC) Protocol Specification (Release 8)", Sep. 2007, pp. 1-17.
3rd Generation Partnership Project (3GPP), TS 36.321 V2.0.0, "Technical Specification Group Radio Access Network, Evolved Universal Terrestrial Radio Access (E-UTRA) Medium Access Control (MAC) Protocol Specification (Release 8)", Nov. 2007, pp. 1-22.
3rd Generation Partnership Project (3GPP), TS 36.321 V8.0.0, "Technical Specification Group Radio Access Network, Evolved Universal Terrestrial Radio Access (E-UTRA) Medium Access Control (MAC) Protocol Specification (Release 8)", Dec. 2007, pp. 1-23.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, pp. 1-43.
3rd Generation Partnership Project (3GPP), TS 36.322 V.8.4.0, "Technical Specification Group Radio Access Network, Evolved Universal Terrestrial Radio Access (E-UTRA) Radio Link Control (RLC) Protocol Specification (Release 8)", Dec. 2008, pp. 1-39.
3rd Generation Partnership Project (3GPP), TS 36.322 V1.2.0, "Technical Specification Group Radio Access Network, Evolved Universal Terrestrial Radio Access (E-UTRA) Radio Link Control (RLC) Protocol Specification (Release 8)", Nov. 2007.
3rd Generation Partnership Project (3GPP), TS 36.322 V8.0.0, "Technical Specification Group Radio Access Network, Evolved Universal Terrestrial Radio Access (E-UTRA) Radio Link Control (RLC) Protocol Specification (Release 8)", Dec. 2007, pp. 1-35.
3rd Generation Partnership Project (3GPP), TS 36.331 V0.5.0, "Technical Specification Group Radio Access Network, Evolved Universal Terrestrial Radio Access (E-UTRA) Radio Resource Control (RRC), Protocol Specification (Release 8)", Nov. 2007.
3rd Generation Partnership Project (3GPP), TS 36.331 V8.0.0, "Technical Specification Group Radio Access Network, Evolved Universal Terrestrial Radio Access (E-UTRA) Radio Resource Control (RRC), Protocol Specification (Release 8)", Dec. 2007, pp. 1-56.
3rd Generation Partnership Project (3GPP), TS 36.331 V8.4.0, "Technical Specification Group Radio Access Network, Evolved Universal Terrestrial Radio Access (E-UTRA) Radio Resource Control (RRC), Protocol Specification (Release 8)", Dec. 2008, pp. 1-198.
3rd Generation Partnership Project(3GPP), R2-074921, R2-073949, "UL Resource Utilisation", Nokia-Siemens-Networks, Nokia Corporation, 3GPP TSG-RAN WG2 Meeting #60, Jeju, Korea, Nov. 5-9, 2007, 4 pages.
Priscoli et al., "Joined MAC Scheduling and Transport Format Choice for UMTS Uplink Transmission", Wireless Personal Communications, vol. 40, No. 1, Jun. 2006, pp. 49-59.

* cited by examiner

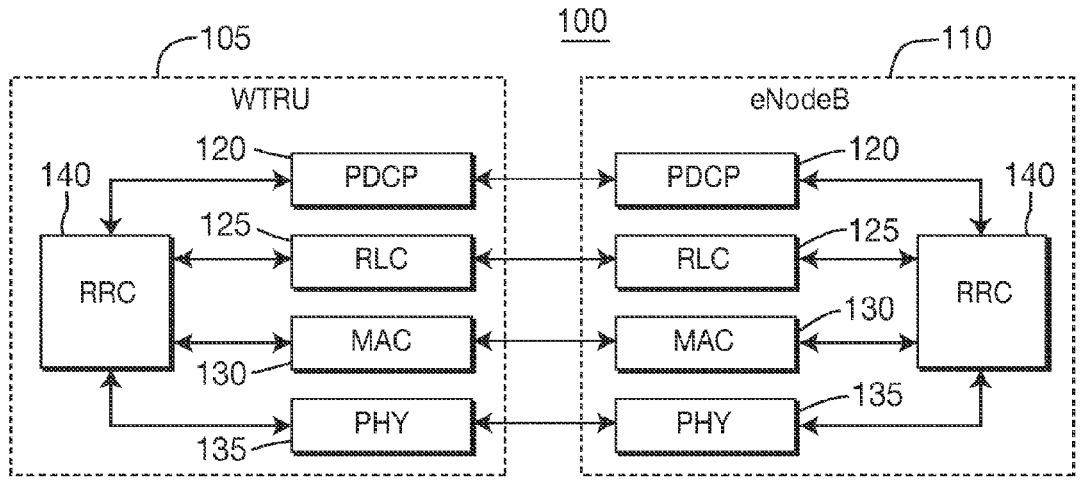
PRIOR ART
FIG. 1
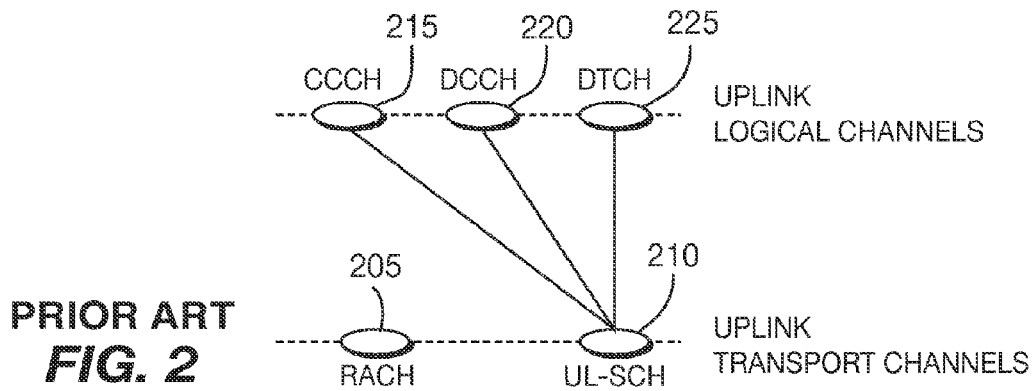
PRIOR ART
FIG. 2
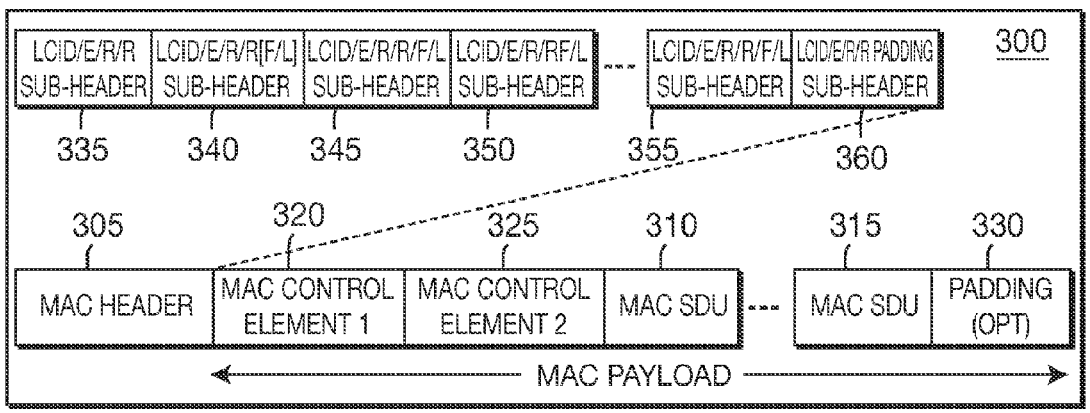
PRIOR ART FIG. 3

METHOD AND APPARATUS FOR PRIORITIZING LOGICAL CHANNELS

CROSS REFERENCE TO RELATED APPLICATIONS

This application is a continuation of U.S. patent application Ser. No. 14/296,224, filed Jun. 4, 2014, which is a continuation of U.S. patent application Ser. No. 13/401,998, filed Feb. 22, 2012, which issued as U.S. Pat. No. 8,774,114 on Jul. 8, 2014, which is a continuation of U.S. patent application Ser. No. 12/360,343, filed Jan. 27, 2009, which issued as U.S. Pat. No. 8,165,152 on Apr. 24, 2012; which claims the benefit of U.S. Provisional Application No. 61/025,383 filed Feb. 1, 2008, and the benefit of U.S. Provisional Application No. 61/025,361 filed Feb. 1, 2008, the contents of each of which are hereby incorporated by reference in their entirety.

BACKGROUND

FIG. 1 shows a long term evolution (LTE) system 100 including a wireless transmit/receive unit (WTRU) 105 and an eNodeB (eNB) 110. Each of the WTRU 105 and the eNB 110 include a user-plane protocol stack having layer 2 (L2) sublayers. The L2 sublayers include a packet data control protocol (PDCP) sublayer 120, a radio link control (RLC) sublayer 125, and a medium access control (MAC) sublayer 130. The protocol stack also includes a physical layer 135. A radio resource control (RRC) sublayer 140 controls each of the PDCP sublayer 120, the RLC sublayer 125, the MAC sublayer 130 and the physical layer 135.

The following functions are supported by the MAC sublayer 130:
1) mapping between logical channels and transport channels;
2) multiplexing of MAC service data units (SDUs) from one or different logical channels onto transport blocks (TBs) to be delivered to the physical layer 135 on transport channels;
3) demultiplexing of MAC SDUs of one or different logical channels from TBs delivered from the physical layer 135 on transport channels;
4) scheduling information reporting;
5) error correction through hybrid automated retransmission request (HARQ);
6) priority handling between WTRUs using dynamic scheduling;
7) priority handling between logical channels of one WTRU;
8) logical channel prioritization; and
9) transport format selection.

One of the functions of the MAC sublayer 130 in the WTRU 105 is logical channel prioritization. FIG. 2 shows available uplink transport channels such as random access channels (RACHs) 205 and uplink shared channels (UL-SCHs) 210, and available uplink logical channels such as common control channels (CCCHs) 215, dedicated control channels (DCCHs) 220 and dedicated traffic channels (DTCHs) 225. The MAC sublayer 130 may receive MAC SDUs, (i.e., RLC protocol data units (PDUs)), from different logical channels coming out of the RLC sublayer 125. The MAC sublayer 130 then multiplexes those MAC SDUs onto one transport channel, (e.g., a UL-SCH 210).

MAC SDUs are prioritized and selected from different logical channels. A logical channel prioritization procedure may be applied when a new MAC transmission is performed. The RRC sublayer 140 may control the scheduling of uplink data by giving each logical channel a priority, where increasing priority values indicate lower priority levels. In addition, each logical channel is configured with a prioritized bit rate (PBR) and, optionally, a maximum bit rate (MBR).

An uplink (UL) grant provides the characteristics of the channel resources to be used for data transmission on the uplink. The UL grant is a 20 bit field that indicates fixed size resource block assignment, modulation and coding scheme (MCS), UL delay and transmit power control (TPC). The UL grant is sent in the downlink (DL) from the eNB 110 to the WTRU 105 to inform the WTRU 105 of the amount and type of channel resource to be used by the WTRU 105 for UL transmissions.

The logical channel prioritization procedure assists the WTRU with serving the logical channels in the following sequence:
1) Logical channels are served in a decreasing priority order up to their configured PBR.
2) If any resources remain, the logical channels are served in a decreasing priority order up to their configured MBR. In case no MBR is configured, the logical channel is served until either the data for that logical channel or the UL grant is exhausted, whichever comes first.
3) Logical channels configured with the same priority are served equally by the WTRU.
4) MAC control elements for basic symbol rate (BSR), with the exception of padding BSR, have a higher priority than user-plane logical channels.

A WTRU has an uplink rate control function which manages the sharing of uplink resources between radio bearers. The RRC controls the uplink rate control function by giving each bearer a priority and a prioritized bit rate (PBR). In addition, an MBR per gross bit rate (GBR) bearer is also configured. The values signaled may not be related to the ones signaled via S1 to an eNB.

The uplink rate control function ensures that the WTRU serves its radio bearers in the following sequence:
1) All of the radio bearers in decreasing priority order up to their PBR; and
2) All of the radio bearers in decreasing priority order for the remaining resources assigned by the grant and the function ensures that the MBR is not exceeded.

In case the PBRs are all set to zero, step 1) is skipped and the radio bearers are served in strict priority order. The WTRU maximizes the transmission of higher priority data. By limiting the total grant to the WTRU, the eNB can ensure that the aggregate MBR (AMBR) is not exceeded. If more than one radio bearer has the same priority, the WTRU may serve these radio bearers equally.

Since resources are owned by the operator, scheduling of radio resources and resource allocation takes place in the MAC sublayer 130 in the eNB 110. However, the MAC sublayer 130 in the WTRU 105 provides the eNB 110 with information such as quality of service (QoS) requirements and WTRU radio conditions (identified through measurements) as an input to the scheduling procedures at the eNB 110.

Initially, it is noted that input parameters may be specified. Constraints for the WTRU output (output of a scheduler in the MAC sublayer 130) may also be specified. However, a mandatory WTRU operation is not required.

For the specification of the input parameters, a token bucket model has been used. The PBR/MBR is the "token rate". In the model, there is a "token bucket size" parameter, but it is unsettled if this is derived by the WTRU from, for example, the token rate or fixed size, or needs to be signaled explicitly by the eNB.

The token bucket is a control mechanism that dictates when traffic can be transmitted. A "bucket" in the context of data transmission is a buffer that holds aggregate network traffic to be transmitted as a means to control traffic. This bucket, (i.e., the buffer), contains tokens that represent the amount of traffic in bytes or packets of a predetermined size that the sender is allowed to transmit. The amount of available tokens can be seen as "credit" that can be cached in when data needs to be transmitted. When the sender runs out of "credit" (i.e., tokens in a bucket), the sender is not allowed to send any more traffic.

The PBR/GBR should not limit the reported buffer status. The impact of the MBR impact on the buffer status reporting is unsettled.

A token bucket model is used to describe the rate calculations, whereby each logical channel will have token buckets associated with it, related to the PBR and MBR. The rates at which tokens are added to the buckets are the PBR and MBR respectively. Token bucket size can not exceed a certain maximum.

The following provides a potential description for rate calculations or equivalently token bucket calculations. If it is accepted that the behavior of the WTRU should be described explicitly, a (token) credit may be used. By way of example, for each time increment Tj, for each bearer j that has a PBR, the PBR credit associated with bearer j is incremented by the value of Tj×PBRj. If the bearer also has an MBR, then the MBR credit associated with the bearer j is incremented by the value of $Tj \times MBR_j$. If upper limits are set for the maximum PBR and/or MBR credits for the bearer, then if the accumulated values exceed the maximum values, they are set equal to the maximum value.

At each scheduling opportunity, (i.e., transmission time interval (TTI)), where the WTRU is permitted to transmit new data, data is selected from the highest priority bearer that has a non-empty buffer state and a non-zero PBR credit. The WTRU can add to the transport block data equal to the size of the buffer, the size of the PBR credit or the available capacity of the transport block whichever is the smaller. The PBR credit and the MBR credit are decremented by the quantity of data assigned.

If the PBR credit of all bearers is zero and there is still space in the transport block, then the scheduler accepts data from the highest priority bearer with data buffered. The scheduler accepts data up to the size of the available space in the transport block or the WTRU's MBR credit, whichever is the smaller. The MBR credit is decremented by the quantity of data that was accepted. The accepted data is combined before data is fetched from the RLC sublayer.

Rate calculations, or equivalently token bucket calculations, may also be described. At every TTI boundary for which a new transmission is requested by the HARQ entity, the WTRU performs the operations described below:

For each logical channel ordered in a decreasing priority order, perform the following:
  If ((PBR_Token_Bucket>=UL_Grant) and (UL_Grant>=amount of data buffered for transmission)).
    serve this logical channel up to MIN(amount of data buffered for transmission, PBR_MAX_OUTPUT_RATE) bytes,
  Else
    If (PBR_Token_Bucket>=0)
      Allowed_Extra_Tokens=MIN(MAX(0, UL_Grant—PBR_Token_Bucket), 0.5*PBR_BUCKET_SIZE)
    Else
      Allowed_Extra_Tokens=0
  serve this logical channel for x bytes, where x is between 0 and MIN(UL_Grant, PBR_Token_Bucket+Allowed_Extra_Tokens, amount of data buffered for transmission, PBR_MAX_OUTPUT_RATE) bytes. The value of x is implementation dependent, (e.g., when choosing the value of x, the WTRU should take into account various factors such as SDU segmentation, serving two logical channels with identical priority fairly, etc.).
  decrement UL_Grant by the served amount of bytes, if any.
  decrement PBR_Token_Bucket by the served amount of bytes, if any.

If UL_Grant is greater than zero, for each logical channel ordered in a decreasing priority order, perform the following:
  if a MBR token bucket has been configured for this logical channel
    If ((MBR_Token_Bucket>=UL_Grant) and (UL_Grant>=amount of data buffered for transmission))—serve this logical channel up to MIN(amount of data buffered for transmission, MBR_MAX_OUTPUT_RATE) bytes;
  Else
    If (MBR_Token_Bucket>=0)
      Allowed_Extra_Tokens=MIN(MAX(0, UL_Grant—MBR_Token_Bucket), 0.5*MBR_BUCKET_SIZE)
    Else
      Allowed_Extra_Tokens=0
  serve this logical channel for x bytes, where x is between 0 and MIN(UL_Grant, MBR_Token_Bucket+Allowed_Extra_Tokens, amount of data buffered for transmission, MBR_MAX_OUTPUT_RATE) bytes. The value of x is implementation dependent (e.g., when choosing the value of x, the WTRU should take into account various factors such as SDU segmentation, serving two logical channels with identical priority fairly, etc.).
  Else
    serve the logical channel up to MIN(UL_Grant, amount of data buffered for transmission) bytes;
  decrement UL_Grant by the served amount of bytes, if any; and
  decrement MBR_Token_Bucket by the served amount of bytes, if any.

Logical channels configured with the same priority shall be served equally by the WTRU.

MAC PDUs and MAC Control Elements

FIG. 3 shows a MAC PDU 300 consisting of a MAC header 305, and may include MAC SDUs 310 and 315, MAC control elements 320 and 325, and padding 330. Both the MAC header 305 and the MAC SDUs 310 and 315 are of variable sizes.

A header of the MAC PDU 300 includes one or more MAC PDU sub-headers 335, 340, 345, 350, 355 and 360, each of which corresponds to a MAC SDU 310 or 315, a MAC control element 320 or 325, or padding 330.

The MAC sublayer can generate MAC control elements, such as buffer status report control elements. MAC control elements are identified via specific values for the logical channel identification (LCID), as shown below in Table 1. Indices 00000-yyyyy correspond to actual logical channels that have a corresponding RLC sublayer, while the remaining values may be used for other purposes, such as for identifying MAC control elements, (e.g., buffer status reports), or padding.

TABLE 1

Values of LCID for UL-SCH

| Index | LCID values |
|---|---|
| 00000-yyyyy | Identity of the logical channel |
| yyyyy-11100 | reserved |
| 11101 | Short Buffer Status Report |
| 11110 | Long Buffer Status Report |
| 11111 | Padding |

RLC

The main services and functions of the LTE RLC sublayer include:
1) Transfer of upper layer PDUs supporting acknowledged mode (AM) or unacknowledged mode (UM);
2) Transparent mode (TM) data transfer;
3) Error Correction through ARQ (CRC check provided by the physical layer, no CRC needed at RLC level);
4) Segmentation according to the size of the TB: only if an RLC SDU does not fit entirely into the TB then the RLC SDU is segmented into variable sized RLC PDUs, which do not include any padding;
5) Re-segmentation of PDUs that need to be retransmitted: if a retransmitted PDU does not fit entirely into the new TB used for retransmission then the RLC PDU is re-segmented;
6) The number of re-segmentation is not limited;
7) Concatenation of SDUs for the same radio bearer;
8) In-sequence delivery of upper layer PDUs except at handover (HO) in the uplink;
9) Duplicate Detection;
10) Protocol error detection and recovery;
11) Flow Control between eNB and WTRU (FFS);
12) SDU discard; and
13) Reset.

The RLC supports three modes of operation: AM (acknowledged mode), UM (unacknowledged mode), and TM (transparent mode) and generates control PDUs, such as STATUS PDUs, which are generated by the AM RLC entities.

It would be desirable to provide an enhanced L2 uplink channel prioritization and rate control method for minimizing padding, while taking into account control traffic and logical channels that correspond to signaling radio bearers (SRBs).

SUMMARY

A method and apparatus are disclosed for prioritizing logical channels when a new transmission is performed. Logical channel resources are allocated for available data to a plurality of logical channels. An MBR credit (i.e., token) is decremented in a buffer (i.e., bucket) associated with a particular one of the logical channels by the size of a MAC SDU. The MBR credit may have a negative value. If any of the allocated channel resources remain, the logical channels are served in a decreasing priority order until the data is exhausted. An RLC SDU is not segmented if the whole RLC SDU fits into the remaining resources. The MAC SDU excludes a MAC PDU header and MAC padding.

The WTRU selects data from a highest priority radio bearer at each scheduling opportunity where the WTRU is permitted to transmit new data. The radio bearer may have a non-empty buffer state and non-zero prioritized bit rate (PBR) credit. The WTRU may add data to the transport block where the data is equal to the size of the buffer, the size of the PBR credit or the available capacity of the transport block, whichever is the smaller.

The disclosed method and apparatus enables the maximum use of available channel resources, (i.e., maximize the UL grant). Thus, if there are still resources available after having met the requirements of a strict priority order and specific prioritized and maximum data rate limits, then the available capacity is used by serving logical channels once again based on a strict priority order but without limiting the assignment to a specific bucket size, (e.g., allowing the MBR credit to be negative). Rather, the assignment is limited by the amount of data to be transmitted by that logical channel or the size of the UL Grant assigned to that logical channel.

The WTRU decrements a PBR credit and an MBR credit by the quantity of data assigned and repeats this step if there is space in the transport block. This step is repeated for radio bearers according to their priority.

A method and apparatus is also disclosed for bit rate control and token/credit bucket updating in a WTRU. The MAC entity in the WTRU may update token buckets associated with data protocol data units (PDUs), but not control PDUs. The WTRU can update the token buckets at various times, and in various measured amounts.

BRIEF DESCRIPTION OF THE DRAWINGS

A more detailed understanding may be had from the following description of the embodiments, given by way of example and to be understood in conjunction with the accompanying drawings wherein:

FIG. 1 shows an LTE user-plane protocol stack;
FIG. 2 shows an illustration of MAC mapping/multiplexing for uplink;
FIG. 3 shows a MAC PDU including a MAC header, MAC Control elements, MAC SDUs and padding.

DETAILED DESCRIPTION

Figure 4:
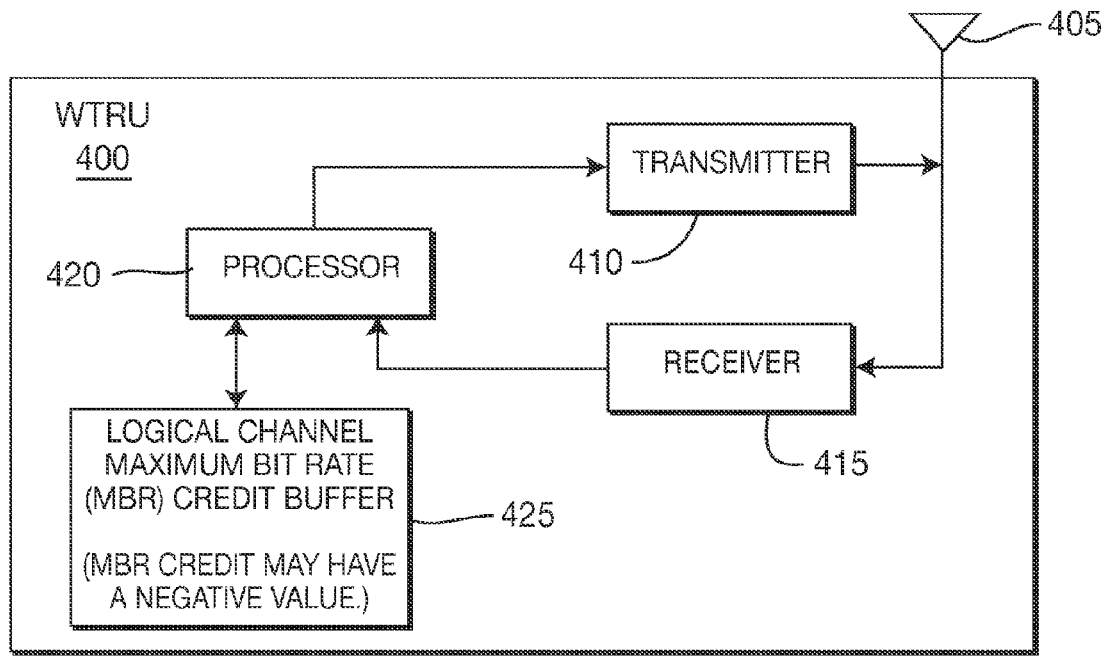
FIG. 4 is a block diagram of a WTRU that uses a logical channel MBR rate credit buffer capable of storing a negative MBR credit value.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing In this disclosure, RLC PDUs are equivalent to MAC SDUs, and updating the token bucket (or credits) generally refers to subtracting an amount of tokens (credits) from the bucket, whereby such amount corresponds to the packet size. Token bucket or credit calculations are equivalent to data rate calculations or rate control calculations. While the methods and apparatus described use a token bucket model, implementation of the data rate control computation logic does not employ a token bucket approach.

Enhanced Uplink Channel Prioritization and Rate Control Functionality

The transmitting MAC entity of a WTRU may perform an additional round of prioritization as set forth in the method below, e.g., in the grant-limited case (i.e., when the WTRU's available data potentially exceeds the grant amount) in order to prevent padding.

At each scheduling opportunity, or TTI, where the WTRU is permitted to transmit new data, the WTRU selects data from the highest priority bearer that has a non-empty buffer state and non-zero PBR credit. The WTRU can add to the transport block data equal to the size of the buffer, the size of the PBR credit or the available capacity of the transport block, whichever is the smaller. The PBR credit and the MBR credit are decremented by the quantity of data assigned. While there is still space in the transport block, this step is repeated for bearers according to their priority.

If the PBR credit of all bearers is zero (or negative) and there is still space in the transport block then the scheduler accepts data from the highest priority bearer with data buffered. It accepts data up to the size of the available space in the transport block or the WTRUs MBR credit, whichever is the smaller. The MBR credit is decremented by the quantity of data that was accepted. The data accepted from the steps above is combined before data is fetched from RLC. While there is still space in the transport block, this step is repeated for bearers according to their priority.

If the MBR credit of all bearers is zero (or negative) and there is still space in the transport block, then the scheduler accepts data from the highest priority bearer with data buffered. It accepts data up to the size of the available space in the transport block. The MBR credit is decremented by the quantity of data that was accepted (it is allowed to become negative or more negative). Here, the data accepted is combined before data is fetched from RLC.

This method may be performed in conjunction with another prioritization scheme, and can be performed even if there are no MBRs configured for some logical channels. If the MBR credit is zero, there is no MBR bucket to consider.

This method can be beneficial in the grant-limited case, e.g. if all other bearers reach or exceed their MBR, or when there is no other data available on some bearers, while there is data available on other bearers that have exceeded their MBR.

The method may be modified to compare the MBR credit with a threshold different than zero. For example if the MBR credit of all bearers is zero (or negative) and there is still space in the transport block then the scheduler accepts data from the highest priority bearer with data buffered. It accepts data up to the size of the available space in the transport block or the difference between the "MBR credit" and the "most negative MBR bucket size allowed", whichever is the smaller. The MBR credit is decremented by the quantity of data that was accepted (hence it is allowed to become negative or more negative). The data accepted is combined before data is fetched from RLC.

If there is insufficient credits or tokens to fill the transport block with data, the transport block utilization should be maximized (and MAC padding should be minimized) by allowing as the final prioritization or rate control step the possibility to accept data from a logical channel that does not have sufficient tokens or credits, instead of performing padding.

The uplink rate control function ensures that the WTRU serves its radio bearers in the following sequence:

1) All the radio bearers in decreasing priority order up to their PBR;
2) All the radio bearers in decreasing priority order for the remaining resources assigned by the grant and the function ensures that the MBR is not exceeded;
3) All the radio bearers in decreasing priority order for the remaining resources assigned by the grant and the function allows that the MBR can be exceeded (in order to minimize/prevent padding in the transport block).

Alternatively, the logical channel prioritization procedure ensures that the WTRU serves the logical channels in the following sequence:

1) All the logical channels are served in a decreasing priority order up to their configured PBR;
2) if any resources remain, all the logical channels are served in a strict decreasing priority order up to their configured MBR. In case no MBR is configured the logical channel is served until either the data for that logical channel or the UL grant is exhausted, whichever comes first; and
3) if any resources remain, all the logical channels are served in a strict decreasing priority order up to one of the following two variants:
   until either the data for that logical channel or the UL grant is exhausted; or
   until either the data for that logical channel or the difference between the "MBR token bucket size" and the "most negative MBR bucket size allowed" or the UL grant is exhausted.

Enhanced Uplink Channel Prioritization and Rate Control for Control PDUs and Control Elements The RLC can generate control PDUs, such as RLC STATUS PDUs for example. Also, the MAC can generate control elements.

Upper layer control PDUs, such as PDCP Control PDUs, PDCP STATUS Reports, robust header compression (ROHC) feedback, and the like, may be mapped onto (or encapsulated as) RLC control PDUs instead of being mapped onto (or encapsulated as) RLC Data PDUs. This may allow upper layer control PDUs such as PDCP Control PDUs to be differentiated at lower layers, (i.e., at the RLC and MAC), and hence allow them to receive improved treatment, (e.g., QoS, faster transmission, etc). The WTRU does not restrict the transmission of RLC control PDUs due to a lack of tokens or credits.

Always Prioritize Control Over Data

The WTRU may not verify/compare/check the token/credit bucket levels for RLC control PDUs, or MAC control elements. The transmitting MAC entity of the WTRU will perform an additional step, in order to prevent padding.

In the additional step, each scheduling opportunity (TTI) where the WTRU is permitted to transmit, it selects data from the highest priority bearer that has control PDUs (or control elements). It can add to the transport block data equal to the size of the control PDUs, or the available capacity of the transport block, whichever is the smaller. The PBR credit and the MBR credit are decremented by the quantity of data assigned. In an alternative, the PBR credit and the MBR credit are not decremented, in the case of control PDUs. While there is still space in the transport block, this step is repeated for bearers according to their priority.

If there is still space in the transport block, the WTRU selects data from the highest priority bearer that has a non-empty buffer state and non-zero PBR credit. It can add to the transport block data equal to the size of the buffer, the size of the PBR credit or the available capacity of the transport block, whichever is the smaller. The PBR credit and the MBR credit are decremented by the quantity of data assigned. While there is still space in the transport block, this step is repeated for bearers according to their priority.

If the PBR credit of all bearers is zero, and there is still space in the transport block, then the scheduler accepts data from the highest priority bearer with data buffered. It accepts data up to the size of the available space in the transport block or the WTRU's MBR credit, whichever is the smaller. The MBR credit is decremented by the quantity of data that was accepted. The data accepted is combined before data is fetched from the RLC. While there is still space in the transport block, this step is repeated for bearers according to their priority.

The WTRU may prioritize the RLC control PDUs or MAC control elements or control PDUs in general, over data PDUs. This will prevent incurring delays or starving control information due to high priority data traffic.

Prioritize Control Over Data, but Up to a Certain Amount

The previous approach prioritizes control over data. However, this can imply that some "higher priority" logical channels may be delayed if there are many control PDUs on "lower priority" logical channels.

Limiting the Size of the Transport Block that can be Utilized for Control

The WTRU may dedicate or guarantee that a part of the transport block will be utilized for data traffic, via limiting the size of the transport block that can be utilized for control traffic. Such limit can be achieved in various ways, such as specifying the maximum proportion of a TB that can be used for control (in the form of a percentage, or in the form of raw size, or any other form). Such proportion may be configured via an RRC information element (IE) that is carried in any RRC message.

Limiting the Rate for Control Traffic

The WTRU may measure and control the rate of control PDUs (or control elements). A new parameter analogous to PBR/MBR, such as a Control BR (bit rate) can be used. The WTRU may limit the number of control PDUs that are sent at the highest priority to an amount governed by control BR. However, this does not prevent control PDUs from being sent on a logical channel when the logical channel is scheduled (at the round of PBR or MBR). The prioritized bit rate for control (e.g. for RLC control PDUs, or MAC control elements) may be configured via an RRC IE that is carried in any RRC message.

Furthermore, it is possible to further differentiate and specify two rates for control: an RLC control bit rate (RCBR), and a MAC control bit rate (MCBR), or the like. Similarly, those parameters may be configured via RRC IEs that are carried in any RRC message.

Avoiding Segmentation for Control

Generally segmenting control information, such as RLC control PDUs or MAC Control elements, is not desirable; in order to have them transmitted/received rapidly (one TTI). The RLC segmentation functionality does not apply to RLC control PDUs (e.g., STATUS PDUs) and there is no MAC segmentation functionality defined.

When the MAC uses token/credit calculations for control does not have sufficient tokens/credits, the MAC may accept the entirety of control PDUs or control elements even when it does not have sufficient tokens/credits, and instead allow the tokens/credits to go negative, as control can not be segmented.

This may be implemented as a selective case, i.e., only allows negative buckets if for control purposes. Alternatively, it can be done as part of allowing negative tokens in general (due to either control or data).

Enhanced Uplink Channel Prioritization for Logical Channels Corresponding to Signaling (e.g. RRC) Radio Bearers In regards to the logical channels that correspond to the signaling radio bearers (SRBs), (e.g., SRB0, SRB1, SRB2), logical channels may have absolute priority over all other logical channels that correspond to data RBs. This can be achieved in two ways:

1) change the logical channel prioritization function to always prioritize SRBs, (i.e., no need for PBR/MBR configurations for SRBs); or
2) configure the PBR/MBR for SRBs to the maximum allowed.

The uplink rate control function is used so that a WTRU serves its radio bearers in the following sequence:

1) All the signaling radio bearers in decreasing priority (Optional: possibly up to a certain rate);
2) All the radio bearers in decreasing priority order up to their PBR;
3) All the radio bearers in decreasing priority order for the remaining resources assigned by the grant and the function ensures that the MBR is not exceeded.

Alternatively, the logical channel prioritization procedure helps the WTRU serve the logical channels in the following sequence:

1) All the logical channels corresponding to SRBs (or to RRC control information) are served in a decreasing priority order (Optional: possibly up to a configured bit rate);
2) All the logical channels are served in a decreasing priority order up to their configured PBR;
3) if any resources remain, all the logical channels are served in a strict decreasing priority order up to their configured MBR. In case no MBR is configured the logical channel is served until either the data for that logical channel or the UL grant is exhausted, whichever comes first.

Architectural Alternatives

Currently, the token/credit calculations (i.e., rate control or bit rate calculations for PBR and MBR) are implemented at the transmitting MAC entity. In one architectural alternative, the WTRU implements rate control calculations in the transmitting RLC entity. The transmitting RLC entity performs the PBR and/or MBR calculations (e.g. the PBR/MBR token/credit bucket calculations).

In another architectural alternative, the WTRU implements rate control calculations in the transmitting PDCP entity. The transmitting PDCP entity performs the PBR and/or MBR calculations (e.g. the PBR/MBR token/credit bucket calculations).

Selective Updating of Token Buckets: Excluding Control PDUs (or Certain Types of PDUs, in General) from PBR and MBR Calculations A WTRU may not take into account the control PDUs generated by the RLC or by the MAC when performing its bit rate calculations, or equivalently when performing token bucket or credit calculations. The WTRU will evaluate whether a packet is control or data. If data, the WTRU will update the associated token buckets. If control, the WTRU will not update the associated token buckets.

The MAC layer of the WTRU may perform the prescribed operations, optionally with the aid of information provided by the RLC. However, other layers within the WTRU (e.g. the RLC or PDCP) may also incorporate the operations.

Excluding RLC Control PDUs from PBR and MBR Calculations

The RLC can generate control PDUs, such as RLC STATUS PDUs for example. Upper layer control PDUs, such as PDCP Control PDUs, PDCP STATUS Reports, robust header compression (ROHC) feedback, and the like may be mapped onto (or encapsulated as) RLC Control PDUs instead of being mapped onto (or encapsulated as) RLC Data PDUs. This will allow upper layer control PDUs, such as PDCP Control PDUs, to be differentiated at lower layers (i.e., at the RLC and MAC) and allow them to receive improved treatment (e.g. quality of service (QOS), faster transmission, and the like).

In regard to RLC PDUs arriving from the transmitting RLC entity to the transmitting MAC entity, the transmitting MAC entity may evaluate whether an RLC PDU (i.e., MAC SDU) is a control PDU or a data PDU. This may be based on information (e.g. primitives/signals) provided from the RLC to the MAC entity or based on examining the D/C field of the RLC PDU header. If there is data, the transmitting MAC entity will update the associated token buckets, (i.e., it will affect the PBR and/or MBR calculations). If it is for control, the transmitting MAC entity will not update the associated token buckets, (i.e., it will not affect the PBR and/or MBR calculations).

Excluding RLC Retransmitted PDUs from PBR and MBR Calculations

The RLC can retransmit data PDUs via ARQ, for example, when a HARQ process fails, or when it receives RLC STATUS reports with negative acknowledgments. Hence, in general, the transmitting RLC entity can submit/provide either new RLC Data PDUs or retransmitted RLC Data PDUs to the transmitting MAC entity.

In regard to RLC PDUs arriving from the transmitting RLC entity to the transmitting MAC entity, the transmitting MAC entity may evaluate whether an RLC PDU, (i.e., MAC SDU), is a control PDU or a data PDU. The determination can be based on information, (e.g., primitives/signals), provided from the RLC to the MAC entity or based on examining the D/C field of the RLC PDU header. If the RLC PDU is data, the transmitting MAC entity will also evaluate whether the RLC Data PDU is a new PDU or a retransmitted PDU. The determination can be done based on information, (e.g., primitives/signals), provided from the RLC to the MAC entity or based on examining one or more fields of the RLC PDU header, such as the re-segmentation flag, or PDU segment number (SN), or segment offset, or any other field.

If the PDU is new data, the transmitting MAC entity will update the associated token buckets (i.e. it will affect the PBR and/or MBR calculations). If the PDU is retransmitted data, the transmitting MAC entity will not update the associated token buckets (i.e. it will not affect the PBR and/or MBR calculations).

The RLC PDU term covers both PDU and PDU segments. The retransmitted PDUs or PDU segments are not counted or considered for PBR/MBR calculations.

Excluding MAC Control Elements and MAC Padding from PBR and MBR Calculations

The MAC can generate control elements, such as buffer status reports for example. It can also generate padding.

For MAC control elements, the transmitting MAC entity will not update the associated token buckets (i.e. it will not affect the PBR and/or MBR calculations). For MAC padding, the transmitting MAC entity will not update the associated token buckets (i.e. it will nit affect the PBR and/or MBR calculations).

What Packet Size to Update the Bucket with?

In order to update the token (credit) bucket, e.g., via subtracting a number of tokens/credits, the transmitting MAC entity of the WTRU may decrement the token/credit bucket of a logical channel:

1) by the size of MAC SDU (i.e. this excludes MAC PDU header and MAC padding);
2) by the size of a MAC PDU (which includes MAC PDU header, PDU payload and MAC padding);
3) by the size of MAC PDU excluding MAC padding (which includes MAC PDU header and PDU payload);
4) by the size of MAC PDU excluding MAC PDU header (which includes MAC PDU payload and MAC padding);
5) by the size of the RLC PDU, (i.e., this includes the RLC PDU header and PDU payload);
6) by the size of the RLC PDU excluding RLC padding, (which includes the RLC header and RLC payload excluding RLC padding);
7) by the size of the RLC PDU payload, (which includes the RLC payload);
8) by the size of the RLC PDU payload excluding RLC Padding (which includes the RLC payload excluding RLC padding);
9) by the size of the PDCP SDU;
10) by the size of the PDCP PDU (i.e. this includes the PDCP PDU header and PDU payload);
11) by the size of the PDCP PDU before header compression is applied, (i.e., this includes the PDCP PDU header and PDU payload before header compression); or
12) by the size of the PDCP PDU before security, (i.e., ciphering and/or integrity protection), is applied, (i.e., this includes the PDCP PDU header and PDU payload before ciphering and/or integrity).

In order to determine size, the transmitting upper sublayer, (e.g., the RLC, or the PDCP) may communicate the size information to the transmitting MAC entity, and the MAC may utilize the information. Inter-layer communication and signaling is used.

Alternatively, the MAC entity examines the upper layer header (e.g. the RLC, or PDCP header), and extracts the size information.

Events and Triggers Used to Update Buckets

The moment or event at which the token/credit bucket is updated can have an impact on the performance of the system. The transmitting MAC entity of the WTRU may decrement the token/credit bucket of a logical channel:

13) at the event/moment when it multiplexes the MAC SDU into a MAC PDU;
14) at the event/moment when it finishes building the MAC PDU;
15) at the event/moment when it submits a new MAC PDU (i.e. a new HARQ PDU) to the physical layer (or HARQ);
16) at the event/moment that it receives a HARQ acknowledgment for the MAC PDU (i.e. for the HARQ PDU);
17) at the event/moment that the HARQ process (carrying the MAC SDU/PDU) completes/finishes (either successfully or unsuccessfully); or
18) at the event/moment that it receives an RLC acknowledgment for the RLC PDU.

For more accuracy, and to prevent the waste/loss of credits for PDUs that have not been transmitted, the tokens may be subtracted from the bucket upon receiving a HARQ acknowledgment.

FIG. 4 is a block diagram of a WTRU 400 that uses a logical channel MBR rate credit buffer capable of storing a negative MBR credit value. The WTRU 400 includes an antenna 405, a transmitter 410, a receiver 415, a processor 420 and at least one logical channel MBR credit buffer 425. MBR credits are buffered by the buffer 425 and may have a negative value. The processor 420 is configured to allocate logical channel resources for available data to a plurality of logical channels, and decrement a maximum bit rate (MBR) credit in the buffer 425 associated with a particular one of the logical channels by the size of a medium access control (MAC) service data unit (SDU), wherein if any of the allocated channel resources remain, the logical channels are served in a decreasing priority order until the data is exhausted. Alternatively, the logical channels are served in a decreasing priority order until an UL grant is exhausted.

Figure 5:
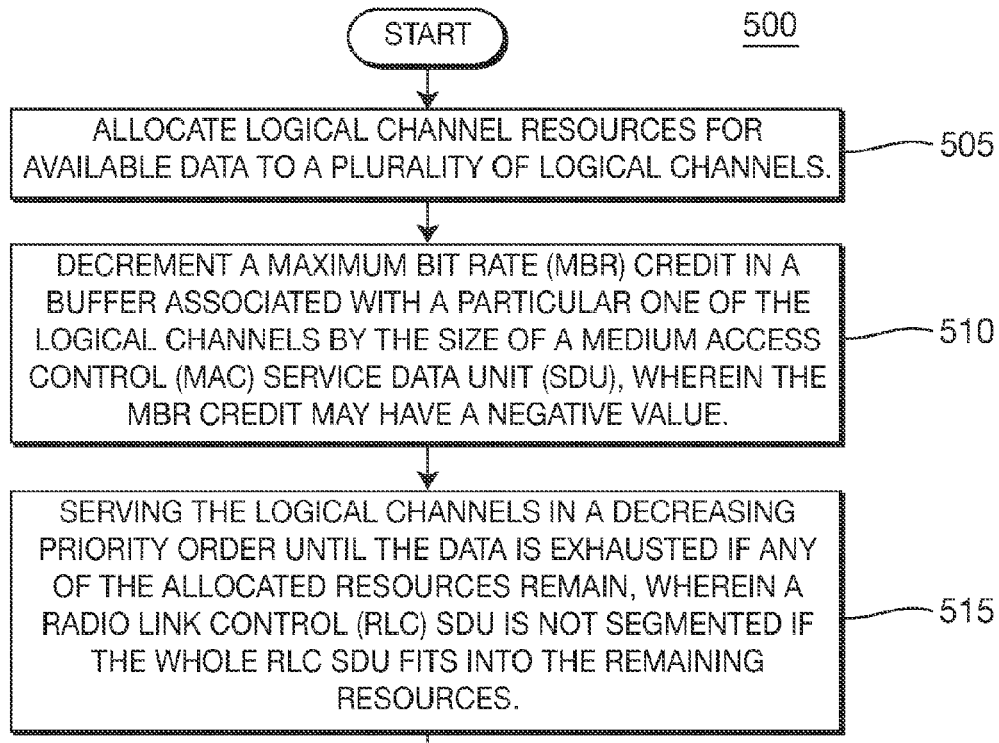
FIG. 5 is a flow diagram of a logical channel prioritization procedure that is applied when a new transmission is performed by the WTRU of FIG. 4.

FIG. 5 is a flow diagram of a logical channel prioritization procedure 500 that is applied when a new transmission is performed by the WTRU 400 of FIG. 4. In step 505, logical channel resources are allocated for available data to a plurality of logical channels. In step 510, an MBR credit in a buffer associated with a particular one of the logical channels is decremented by the size of a MAC SDU.

The MAC SDU corresponds to the MAC payload that will be carried in a particular transport block, (i.e., the available space allocated to the WTRU on a transport block at a specific TTI). A logical channel can only be served up to the size of the MAC SDU that will be transported onto the transport block. Thus, if the allocated "credit" for a particular logical channel is larger than the size of the MAC SDU, that credit will be decremented by the size of the MAC SDU until the credit is exhausted.

Assigned resources are maximized by utilizing available space in a configured transport block in the most efficient way possible. Thus, since the content of one or multiple logical channels is delivered through RLC SDUs, the whole RLC SDU is included in the RLC PDU even if there aren't enough MBR credits/tokens available, (i.e., allowing the MBR credit to become negative), thereby avoiding segmentation and delay.

The MAC SDU excludes a MAC PDU header and MAC padding. The MBR credit may have a negative value. In step 515, if any of the allocated resources remain, the logical channels are served in a decreasing priority order until the data is exhausted. Alternatively, the logical channels are served in a decreasing priority order until an UL grant is exhausted. An RLC SDU is not segmented if the whole RLC SDU fits into the remaining resources.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit receive unit (WTRU), the method comprising:
receiving an uplink grant;
determining that there is data available for transmission from one or more of a plurality of logical channels, wherein the plurality of logical channels comprise a first logical channel associated with a signaling radio bearer (SRB) and a second logical channel associated with user data transmissions;
allocating resources for transmission to the one or more of the plurality of logical channels that have data available for transmission and that have a prioritized bit rate (PBR) credit greater than zero, wherein the first logical channel is configured with a maximum allowed PBR credit based on the first logical channel being associated with the SRB;
decrementing at least one PBR credit for at least one logical channel by a size of a medium access control (MAC) service data unit (SDU) served to the at least one logical channel;
determining that the PBR credits for each of the plurality of logical channels with additional data available for transmission is zero or less than zero;
allocating remaining resources available for transmission to the plurality of logical channels with additional data available for transmission in a strict priority order based on determining that the PBR credits for each of the plurality of logical channels with additional data available for transmission is zero or less than zero; and
transmitting in accordance with the uplink grant.

2. The method as in claim 1, wherein the SRB is one of SRB0, SRB1, or SRB2.

3. The method as in claim 1, wherein the SRB is associated with transmission of radio resource control (RRC) messages.

4. The method as in claim 1, wherein MAC control elements (CEs) are not associated with a corresponding PBR credit.

5. The method as in claim 4, further comprising prioritizing at least one MAC CE for transmission over the second logical channel based on the second logical channel being a logical channel associated with the user data transmissions.

6. The method as in claim 1, wherein each of the plurality of logical channels is also associated with a respective maximum bit rate (MBR).

7. The method as in claim 1, wherein the size of the MAC SDU does not include a MAC packet data unit (PDU) header or MAC padding.

8. The method as in claim 1, wherein at least one PBR credit is allowed to become negative in order to avoid segmenting a radio link control (RLC) data packet data unit (PDU).

9. The method as in claim 1, further comprising allocating resources for transmission to at least one medium access control (MAC) control element (CE) prior to allocating resources to a logical channel associated with radio link control (RLC) packet data units (PDUs).

10. A wireless transmit receive unit (WTRU) comprising a processor configured to:
- receive an uplink grant;
- determine that there is data available for transmission from one or more of a plurality of logical channels, wherein the plurality of logical channels comprise a first logical channel associated with a signaling radio bearer (SRB) and a second logical channel associated with user data transmissions;
- allocate resources for transmission to the one or more of the plurality of logical channels that have data available for transmission and that have a prioritized bit rate (PBR) credit greater than zero, wherein the first logical channel is configured with a maximum allowed PBR credit based on the first logical channel being associated with the SRB;
- decrement at least one a PBR credit for at least one logical channel by a size of a medium access control (MAC) service data unit (SDU) served to the at least one logical channel;
- determine that the PBR credits for each of the plurality of logical channels with additional data available for transmission is zero or less than zero;
- allocate remaining resources available for transmission to the plurality of logical channels with additional data available for transmission in a strict priority order based on determining that the PBR credits for each of the plurality of logical channels with additional data available for transmission is zero or less than zero; and
- transmit in accordance with the uplink grant.

11. The WTRU as in claim 10, wherein the SRB is one of SRB1 or SRB2.

12. The WTRU as in claim 10, wherein the SRB is associated with transmission of radio resource control (RRC) messages.

13. The WTRU as in claim 10, wherein MAC control elements (CEs) are not associated with a corresponding PBR credit.

14. The WTRU as in claim 10, wherein each of the plurality of logical channels is also associated with a respective maximum bit rate (MBR).

15. The WTRU as in claim 10, wherein the size of the data served to the corresponding logical channel does not include a MAC packet data unit (PDU) header or MAC padding.

16. The WTRU as in claim 10, wherein at least one PBR credit is allowed to become negative in order to avoid segmenting a given radio link control (RLC) protocol data unit (PDU).

* * * * *

UNITED STATES PATENT AND TRADEMARK OFFICE
CERTIFICATE OF CORRECTION

PATENT NO. : 9,913,286 B2  
APPLICATION NO. : 15/297407  
DATED : March 6, 2018  
INVENTOR(S) : Mohammed Sammour et al.

Page 1 of 1

It is certified that error appears in the above-identified patent and that said Letters Patent is hereby corrected as shown below:

In the Claims

Column 15, Line 26 Claim 10: replace "one a PBR" with --one PBR--.

Signed and Sealed this
Thirtieth Day of October, 2018

Andrei Iancu
*Director of the United States Patent and Trademark Office*